(12) United States Patent
Luo et al.

(10) Patent No.: US 9,502,035 B2
(45) Date of Patent: Nov. 22, 2016

(54) VOICE RECOGNITION METHOD FOR MOBILE TERMINAL AND DEVICE THEREOF

(71) Applicant: Smartisan Digital Co., Ltd., Chaoyang District, Beijing (CN)

(72) Inventors: Yonghao Luo, Beijing (CN); Xin Chen, Beijing (CN)

(73) Assignee: SMARTISAN DIGITAL CO., LTD., Beijing (CN)

( * ) Notice: Subject to any disclaimer, the term of this patent is extended or adjusted under 35 U.S.C. 154(b) by 0 days.

(21) Appl. No.: 14/787,926

(22) PCT Filed: Apr. 25, 2014

(86) PCT No.: PCT/CN2014/076180
§ 371 (c)(1),
(2) Date: Oct. 29, 2015

(87) PCT Pub. No.: WO2014/177015
PCT Pub. Date: Nov. 6, 2014

(65) Prior Publication Data
US 2016/0098991 A1    Apr. 7, 2016

(30) Foreign Application Priority Data

May 2, 2013    (CN) .......................... 2013 1 0157943

(51) Int. Cl.
*H04M 1/00*        (2006.01)
*G10L 15/22*       (2006.01)
(Continued)

(52) U.S. Cl.
CPC ............. *G10L 15/22* (2013.01); *G10L 15/063* (2013.01); *G10L 15/08* (2013.01); *H04M 1/271* (2013.01);
(Continued)

(58) Field of Classification Search
CPC ............................. H04M 1/271; G10L 15/22
USPC .......... 455/79, 67.7, 563; 704/231, 270, 275
See application file for complete search history.

(56) References Cited

U.S. PATENT DOCUMENTS

| | | | |
|---|---|---|---|
| 6,449,496 B1 * | 9/2002 | Beith | H04M 1/271 379/88.03 |
| 6,741,963 B1 * | 5/2004 | Badt | G10L 15/22 704/246 |

(Continued)

FOREIGN PATENT DOCUMENTS

| | | |
|---|---|---|
| CN | 1801846 A | 7/2006 |
| CN | 101601259 A | 12/2009 |

(Continued)

OTHER PUBLICATIONS

International Searching Authority, State Intellectual Property Office of the P.R. China, International Search Report for PCT/CN2014/076180, mailed Jul. 29, 2014.

*Primary Examiner* — Sonny Trinh
(74) *Attorney, Agent, or Firm* — Honigman Miller Schwartz and Cohn LLP; Matthew H. Szalach; Jonathan P. O'Brien

(57) ABSTRACT

A voice recognition method and device, for improving efficiency and accuracy of voice recognition. The method comprises: receiving a trigger message of an operation class to be operated for operating on a mobile terminal, wherein the operation class is a class divided according to the service function of the mobile terminal (S101); receiving voice keyword information and determining a voice keyword from the voice keyword information (S102); and retrieving a keyword library under an operation class entry to be operated in accordance with the voice key word, and returning a search result (S103).

11 Claims, 1 Drawing Sheet

(51) Int. Cl.
*G10L 15/06* (2013.01)
*H04M 1/27* (2006.01)
*H04M 1/725* (2006.01)
*H04W 8/18* (2009.01)
*G10L 15/08* (2006.01)

(52) U.S. Cl.
CPC ..... *H04M 1/72522* (2013.01); *H04M 1/72569* (2013.01); *H04W 8/183* (2013.01); *G10L 2015/0635* (2013.01); *G10L 2015/088* (2013.01); *G10L 2015/223* (2013.01); *G10L 2015/228* (2013.01); *H04M 2250/74* (2013.01)

(56) References Cited

U.S. PATENT DOCUMENTS

| | | | |
|---|---|---|---|
| 2003/0156130 A1* | 8/2003 | James | G06F 3/167 715/728 |
| 2004/0230436 A1 | 11/2004 | Sugawara et al. | |
| 2005/0059432 A1* | 3/2005 | Choi | H04M 1/72583 455/563 |
| 2009/0273682 A1 | 11/2009 | Shekarri et al. | |
| 2010/0105435 A1 | 4/2010 | Ueda et al. | |
| 2011/0022393 A1 | 1/2011 | Waeller et al. | |
| 2013/0132079 A1 | 5/2013 | Sehgal et al. | |

FOREIGN PATENT DOCUMENTS

| | | |
|---|---|---|
| CN | 101853253 A | 10/2010 |
| CN | 101855521 A | 10/2010 |
| CN | 102591932 A | 7/2012 |
| CN | 102663016 A | 9/2012 |
| CN | 102915733 A | 2/2013 |
| CN | 103020069 A | 4/2013 |
| CN | 103077176 A | 5/2013 |

* cited by examiner

VOICE RECOGNITION METHOD FOR MOBILE TERMINAL AND DEVICE THEREOF

This application is a national phase application of International Application No. PCT/CN2014/076180, titled VOICE RECOGNITION METHOD FOR MOBILE TERMINAL AND DEVICE THEREOF which claims priority to Chinese Patent Application No. 201310157943.0 titled "VOICE RECOGNITION METHOD FOR MOBILE TERMINAL AND DEVICE THEREOF" filed on May 2, 2013 with the State Intellectual Property Office of China, the disclosures of which are hereby incorporated by reference in their entirety.

TECHNICAL FIELD

This disclosure relates to the field of information processing technology, and in particular to a voice recognition method for a mobile terminal and a device thereof.

BACKGROUND

Human-machine interaction is necessary for the usage of a mobile terminal. A common way of human-machine interaction with a smart mobile terminal is to touch a screen of the mobile terminal through a finger, and the interaction is achieved via sensing touch pressure information of the finger by the sensor built in the mobile terminal. As Apple integrates the function of a voice assistant Siri to iPhone products, the way of human-machine interaction changes from conventional physical touch to voice control, i.e., to instruct the mobile terminal to accomplish a task desired by a user through human language. During the voice recognition, the user can casually give instructions in a natural language to voice assistant software, related devices of the mobile terminal receive the instructions, voice assistant software performs voice recognition and semantic analysis at a local and/or cloud server, and feeds back based on recognition and analysis results.

However, due to limitation of the conventional technology of voice recognition, especially of semantic analysis, accuracy is low in the recognition, error rates in recognition and analysis of multiple words, long sentences and multiple sentences are quite high, and the recognition and analysis results are usually far from a real desire of a user. The user needs to repeatedly input and keep revising the recognition and analysis results, which significantly affects the recognition accuracy and speed of the voice recognition method based on mobile terminal.

SUMMARY

In view of this, a voice recognition method for a mobile terminal and a device thereof are provided according to embodiments of the disclosure, in order to improve the accuracy and speed of voice recognition for the mobile terminal.

The voice recognition method for a mobile terminal provided in the disclosure includes:

receiving a trigger message of an operation category of an operation to be performed on the mobile terminal, where the operation category is one of categories classified by service functions of the mobile terminal; receiving voice keyword information, and determining a voice keyword from the voice keyword information; and searching, based on the voice keyword, a keyword library under the operation category of the operation to be performed, and returning a search result.

Optionally, the receiving a trigger message of an operation category of an operation to be performed on the mobile terminal includes:

presenting an operation category window on a screen of the mobile terminal, and determining that a trigger message of an operation category of an operation to be performed on the mobile terminal is received in a case that a label corresponding to an operation category in the operation category window is clicked or is determined as a focus.

Further optionally, the label corresponding to an operation category in the operation category window includes a contact label for communication service, an application label for application service, a music label for music playing service, and/or a web search label for online search service.

Optionally, the receiving a trigger message of an operation category of an operation to be performed on the mobile terminal includes:

determining whether a component of a gravitational acceleration monitored by a first monitor along z axis is in a range of zero to four gravitational acceleration units, whether components of the gravitational acceleration along x and y axes respectively are in a range of four to ten gravitational acceleration units, and whether a distance monitored by a second monitor is zero, where the x and y axes are in a plane of a panel of the mobile terminal, the z axis is perpendicular to the plane formed by the x and y axes, the first monitor is a monitor for a gravity sensor and the monitor is registered after a sensor service is received, and the second monitor is a monitor for a distance sensor and the monitor is registered after the sensor service is received; if yes for all the determinations, then determining that a trigger message of an operation category of an operation to be performed on the mobile terminal is received, where the operation category is contact; and then the receiving voice keyword information, determining a voice keyword from the voice keyword information, searching, based on the voice keyword, a keyword library under the operation category of the operation to be performed, and returning a search result including:

receiving voice keyword information including a contact, determining a contact keyword from the voice keyword information, searching a contact library according to the contact keyword, returning a retrieved contact and calling the contact.

Further optionally, in a case that a plurality of contacts are retrieved according to the contact keyword, each of the plurality of contacts is numbered, numbered voice information is received, and a contact corresponding to the numbered voice information is called.

Optionally, after the mobile terminal is operated, a frequency of the keyword corresponding to the operation and in the keyword library under the operation category is increased, and keywords in the keyword library are searched according to a descending order of keyword frequencies when the keyword library under the operation category of the operation to be performed is searched based on the voice keyword.

Optionally, after the mobile terminal is operated, the voice keyword library under the operation category is updated based on the search result in a case that a preset condition is met.

A voice recognition device for a mobile terminal provided in this disclosure includes a trigger message receiving unit, a voice keyword information receiving unit, a voice keyword recognition unit and a keyword library searching unit, where:

the trigger message receiving unit is configured to receive a trigger message of an operation category of an operation to be performed on the mobile terminal, where the operation category is one of categories classified by service functions of the mobile terminal;

the voice keyword information receiving unit is configured to receive voice keyword information;

the voice keyword recognition unit is configured to determine a voice keyword from the voice keyword information; and the keyword library searching unit is configured to search, based on the voice keyword, a keyword library under the operation category of the operation to be performed, and return a search result.

Optionally, the trigger message receiving unit includes an operation category window presenting subunit and a trigger message receiving subunit; where the operation category window presenting subunit is configured to present an operation category window on a screen of the mobile terminal, and the trigger message receiving subunit is configured to receive a trigger message of an operation category of an operation to be performed on the mobile terminal in a case that a label corresponding to an operation category in the operation category window is clicked or is determined as a focus.

Optionally, the trigger message receiving unit includes a monitoring-result determining subunit and a trigger message receiving subunit; where the monitoring-result determining subunit is configured to determine whether a component of a gravitational acceleration monitored by a first monitor along z axis is in a range of zero to four gravitational acceleration units, whether components of the gravitational acceleration along x and y axes respectively are in a range of four to ten gravitational acceleration units, and whether a distance monitored by a second monitor is zero, where the x and y axes are in a plane of a panel of the mobile terminal, the z axis is perpendicular to the plane formed by the x and y axes, the first monitor is a monitor for a gravity sensor and the monitor is registered after a sensor service is received, and the second monitor is a monitor for a distance sensor and the monitor is registered after the sensor service is received;

the trigger message receiving subunit is configured to determine that a trigger message of an operation category of an operation to be performed on the mobile terminal is received if yes for all the determinations, where the operation category is contact;

the voice keyword information receiving unit is configured to receive voice keyword information including a contact, the voice keyword recognition unit is configured to determine a contact keyword from the voice keyword information, the keyword library searching unit is configured to search a contact library according to the contact keyword, and return a retrieved contact; and the device further includes a calling unit configured to call the retrieved contact.

Further optionally, the device includes a contact numbering unit and a numbered voice information receiving unit, the contact numbering unit is configured to number each contact in a case that a plurality of contacts are searched based on the contact keyword, the numbered voice information receiving unit is configured to receive numbered voice information, and the calling unit is configured to call a contact corresponding to the numbered voice information.

Optionally, the device further includes a keyword frequency increasing unit configured to increase a frequency of the keyword corresponding to the operation and in the keyword library under the operation category after the mobile terminal is operated, and the keyword library searching unit is configured to search the keyword library according to a descending order of keyword frequencies when searching, based on the voice keyword, the keyword library under the operation category of the operation to be performed.

Optionally, the device further includes a keyword updating unit configured to, after the mobile terminal is operated, update the keyword library under the operation category according to an operation result in a case that a preset condition is met.

According to the embodiments of the disclosure, after a trigger message of one of operation categories classified based on service functions of the mobile terminal is received, the voice keyword information is received, the voice keyword is determined from the voice keyword information, then, a corresponding keyword library is searched based on the voice keyword, and a search result is returned. Compared with conventional voice recognition technology, the operation categories are classified based on service functions in the embodiments of the disclosure, and the keyword library just corresponds to an operation category, Thus, in one aspect, a retrieved object is limited within the keyword library corresponding to the operation to be performed on the mobile terminal during the search based on the voice keyword, and the number of processed objects is reduced, which adapts to the relatively weak processing ability of the mobile terminal; in another aspect, the reduce of the number of processed objects during the search shortens time for the search, thus an efficiency of voice recognition is improved; and in still another aspect, the reduce of the number of processed objects during the search also decreases probabilities of repetition and ambiguity of the keyword, thereby improving accuracy of voice recognition. Further, in the embodiments of the disclosure, the voice information is received in the form of voice keyword information rather than an ordinary natural language, therefore, multiple words, long sentences and multiple sentences are avoided. Hence, in one aspect, it is easier to extract the keyword from the voice information, thereby improving the efficiency of voice recognition; and in another aspect, a returned result is obtained through matching the keyword extracted from the voice keyword information with the keyword library, which benefits for the accuracy of voice recognition.

BRIEF DESCRIPTION OF THE DRAWINGS

In order for clarity of the technical solutions according to the embodiments of the disclosure or in conventional technology, the drawings for description of the embodiments or conventional technology are described briefly hereinafter. Apparently, the drawings described hereinafter are just a few embodiments of the disclosure, other drawings or embodiments may be obtained by those skilled in the art according to the embodiments shown in these drawings.

DETAILED DESCRIPTION OF THE EMBODIMENTS

To enable those skilled in the art to better understand the technical solutions of the disclosure, the technical solutions according to the embodiments of the disclosure will be described clearly and completely in conjunction with the drawings hereinafter. Apparently, the described embodiments are just a few rather than all of the embodiments of the disclosure. All other embodiments obtained by those skilled in the art based on the embodiments of the disclosure without any creative work fall within the protection scope of the disclosure.

Figure 1:
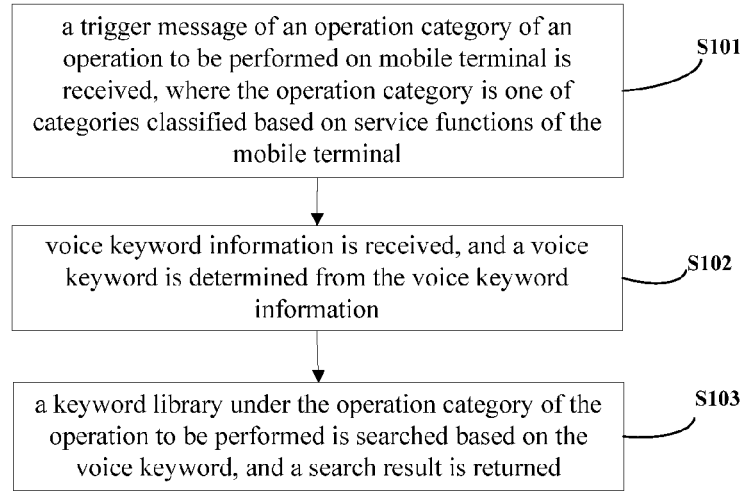
FIG. 1 is a flow chart of a voice recognition method for a mobile terminal according to an embodiment of the disclosure.

Referring to FIG. 1, a flow chart of a voice recognition method for a mobile terminal according to an embodiment of the disclosure is shown. The process includes steps S101-S103.

In step S101, a trigger message of an operation category of an operation to be performed on mobile terminal is received, where the operation category is one of categories classified based on service functions of the mobile terminal.

With development of information technology, the mobile terminal has many new service functions, such as network retrieval, playing audio and video, and playing games, beyond conventional communication functions. The service functions are various in properties, and operating modes and operating instructions for users of the mobile terminals to achieve the service functions are diverse. However, various operations for achieving a same service function usually have common characteristics, and in the embodiment, various possible operations on the mobile terminal are classified into categories in advance based on differences among service functions. Subsequent voice recognition is clearly targeted due to the classification of operation categories. Numbers and types of classified operation categories are not limited in the embodiment, as long as requirements in practice can be met. For example, possible operations on the mobile terminal may be classified, based on service functions of the mobile terminal and application scope of a mobile terminal user, into the following categories: a category of contacts, a category of applications, a category of music, and a category of web search. The category of contacts is for storing information such as names, telephone numbers, and personal characteristics of the contacts. When a contact is recognized through voice, the information related to the contact can be viewed, the contact may be called, and a short message may be sent to the contact, etc. The category of applications is for recording information related to the applications such as names, icons, storage locations of the applications. When an application is recognized through voice, basic attribute information of the application can be viewed, and various operations such as starting, uninstalling, deleting, and updating can be performed on the application. The category of music is for recording related information such as name of the music, singer and album. When a piece of music is recognized through voice, basic attribute information of the music can be viewed, and various operations such as playing, moving, and deleting may be performed on the music. The category of web search is for performing web search.

In step S102, voice keyword information is received, and a voice keyword is determined from the voice keyword information.

If a user of the mobile terminal is to control or operate on the mobile terminal through voice, a voice recognition engine may be started into an operating state. When the voice recognition is desired, voice keyword information is received by the voice recognition engine. The voice information received in the embodiment is voice content with a topic of a keyword, and may be not a complete sentence in an ordinary natural language. For example, if it is required to call a person Zhang XX, the voice in conventional technology is 'call Zhang XX', while according to this embodiment, 'Zhang XX' may be directly said when operation category information is determined as 'contact', i.e., the mobile terminal can be controlled to accomplish a corresponding operation with only a given keyword of the operation.

After the voice keyword information is received, a voice keyword is to be determined from the voice keyword information. The voice information of the mobile terminal user is usually not accurately just the voice keyword, e.g., the voice information may include some transition sounds, tone sounds, etc., which belong to noise for voice recognition and need to be removed from the voice keyword information to extract the voice keyword. The voice keyword directly corresponds to a keyword in a keyword library, and further corresponds to an operation instruction.

In step S103, a keyword library under the operation category of the operation to be performed is searched based on the voice keyword, and a search result is returned.

After the voice keyword is determined through the forgoing steps, a keyword library corresponding to the operation category of the operation to be performed is searched based on the keyword, and a search result is returned. After the search result is obtained, an operation corresponding to the search result may be triggered on the mobile terminal.

It should be noted that, the steps S101 and S102 in the embodiment may be executed in parallel or the step S102 may be executed before the step S101 in practice, i.e., the mobile terminal user may trigger an operation category of an operation to be performed at first, and then receive a voice keyword input by a user; or may receive a voice keyword input by the user at first, and then receive a trigger from the user for an operation category of an operation to be performed; or may receive the trigger for an operation category of an operation to be performed and a voice keyword simultaneously. An order of the two steps does not affect achievement of the purpose of the disclosure, and an appropriate way may be chosen as desired in application.

According to the embodiment, after the trigger message of one of operation categories classified based on service functions of the mobile terminal is received, voice keyword information is received, and a voice keyword is determined from the voice keyword information. Then a corresponding keyword library is searched based on the voice keyword, and a search result is returned. Compared with conventional voice recognition technology, the embodiment of the disclosure may have the following technical effects:

(1) The operation categories are classified based on service functions, each keyword library respectively corresponds only to each operation category, which is different from a total voice recognition library including all operation properties and modes in the conventional voice recognition, therefore, a retrieved object is limited only within the keyword library corresponding to the operation to be performed on the mobile terminal during the searched based on the voice keyword, the number of processed objects is reduced, which adapts to the relatively weak processing ability of the mobile terminal. For example, a conventional voice recognition library includes 100 voice operation instructions. According to the embodiment, the 100 voice operation instructions are classified, and the instructions for 'contact' are classified into one category, which includes 10 voice operation instructions. When the mobile terminal user only needs the function of 'contact', voice retrieval recognition is triggered within the category, i.e., it only needs to search within the 10 voice operation instructions, thus, the number of processed objects is greatly reduced.

(2) The number of processed objects during the search is greatly reduced, with a constant processing ability of the mobile terminal, time for the search is greatly shortened, a search result corresponding to the voice keyword input by the user may be provided in a short time, thus an efficiency of voice recognition is improved. Still taking the forgoing example, suppose the time for searching each voice operation instruction is 0.01 s and a voice word spoken by the user is in a $80^{th}$ position, according to the conventional voice recognition method, the voice operation instruction can only be found after 80 times of search in the forgoing voice recognition library including 100 voice operation instructions, which takes 0.8 s. But if the search is limited to 10 voice operation instructions for the function of 'contact', it takes up 0.1 s at most. It can be seen that the time for search is greatly shortened, and the efficiency of voice recognition is improved.

(3) Since the number of processed objects during the search is greatly reduced, probabilities of repetition and ambiguity of the keyword are reduced, and thus the accuracy of voice recognition is improved. For example, a user says a word 'Zhang XX', and two 'Zhang XX' may be found in the forgoing 100 voice operation instructions, one of which is the name of a contact stored in the mobile terminal by the user, and another one of which is the name of a singer stored in a music library of the user. That is, the voice word is repetitive and ambiguous. In this case, the system does not know whether the mobile terminal user wants to call the 'Zhang XX' in the contacts, or wants to listen to a song of 'Zhang XX' in the music library. If the former is chosen by default, the user may desire the latter actually; and if the latter is chosen by default, the user may desire the former actually. In this embodiment, since the user designates the operation category in advance, the user wants to call 'Zhang XX' when saying 'Zhang XX' if the designated category is 'contact'; and the user wants to listen to the song of 'Zhang XX' when saying 'Zhang XX' if the designated category is 'music'. Thus the operation of voice recognition can be performed accurately.

(4) The voice information is received in the form of voice keyword information rather than an ordinary natural language, and thus multiple words, long sentences and multiple sentences are avoided. In one aspect, it is easier to extract the keyword from the voice information, so the efficiency of voice recognition is improved. In another aspect, a returned result is obtained through matching the keyword extracted from the voice keyword information with the keyword library, which is benefit for improving the accuracy of voice recognition.

As mentioned in the forgoing embodiments, it is required to receive the trigger message of the operation category of an operation to be performed on a mobile terminal. In practice, the trigger message may be received in many ways. For example, when the user needs to operate and control the mobile terminal through the voice recognition engine, an operation category window is presented on a screen of the mobile terminal, and various operation category labels are displayed in the category window. The category labels may include a contact label for communication service, an application label for application service, a music label for music playing service, a web search label for online search service, etc. When the user click on one of these category labels or a focus moves to a category label, a trigger event (trigger message) is generated in the system. It may be regarded that the trigger message of the operation category is received when the trigger event has been detected. Another example, if the user enables an auto-update feature for an application, and a newer version of the application is available online, the mobile terminal receives an update notification, and reception of the update notification is regarded as the trigger message for an operation category of 'application'. Thus a voice instruction of the user may be received to update or not to update the application. In addition, besides the reception of a trigger message of the operation category determined based on a touch event or network event as, the reception of the trigger message of the operation category may be determined based on some habitual actions performed by the user to the mobile terminal. A common action such as placing a mobile phone to an ear of a user indicates that the user needs to call a contact. In this case, it may be regarded that the category of 'contact' is received. The process of this trigger mode is as follows.

A sensor service of the system is obtained when the voice recognition engine is initialized. A monitor for a gravity sensor and a monitor for distance sensor are registered, where the gravity sensor may provide components of the gravitational acceleration in three dimensions (x, y, z). When the mobile phone is placed horizontally, a value of the gravitational acceleration along z axis is about 9.8, and components along x and y axes are about 0. A voice assistant application monitors a value returned from the gravitational acceleration sensor in real-time. When the mobile phone is placed horizontally or is tilted slightly (i.e., typically when a user holds the mobile phone flatly), the component of the gravitational acceleration along z axis is about 7, and the value returned from the distance sensor is determined to be non-zero (i.e., there is no object shielding at the distance sensor of the mobile phone). If these two conditions are satisfied, the process is initialized, and initialization time is recorded. Before the user places the mobile phone to the ear, the distance sensor always returns a non-zero value (there is no shielding object), and the state in this case is working. When the user places the mobile phone to the ear, the component of the gravitational acceleration along z axis is about 2 (it should be noted that, a value within a range of zero to four gravitational acceleration units satisfies the purpose of the disclosure) and in this case, a sum of absolute values of the gravitational acceleration along x and y axes tend to 7 (this value may be within a range of 4 to 10). Considering there is a tilt angle along x axis when the user places the mobile phone to the ear, the absolute value of the gravitational acceleration along x axis should be greater than 2 in this case. If the forgoing conditions are satisfied and the system is in the working state, a system state is put to WAIT_PROXI, and the system in this state waits for the distance sensor to return a value of 0 (the distance sensor is shielded by a face). Once the value of 0 is returned, a dial operation for calling the contact is started. If before the distance sensor returns the value of 0, a whole process from the initialization to the state of WAIT_PROXI takes more than 2 seconds, it is determined that the action recognition fails. After a dial function for calling the contact is started, the user may directly call the name of a contact, and the system reads a contact satisfying the condition among a contact list according to a recognition result. If there are multiple matched contacts, the system prompts the user through voice, e.g., (1. Chen XX. 2. Liu XX), and the user only needs to say '1' or '2' to choose to call Chen XX or Liu XX. After the user chooses, the system prompts the user that dialing is being performed, and directly calls the contact chosen by the user. If there is only one contact, the system directly prompts the user that dialing is being performed and calls the contact.

In the foregoing embodiments, a way to search a keyword library under the operation category after obtaining the voice keyword is not defined, which does not affect the realization of the purpose of this disclosure. Although, a user inevitably develops a habit in a long-term during using the voice recognition function. This habit may be utilized during searching the keyword library. For example, if an operation is frequently performed on a mobile terminal, it indicates that this operation is often desired by the user. In this case, a counter may be set to record, after an operation is performed on a mobile terminal, the total number of times (frequency) of the operation being performed. The total number of times is taken as an attribute of the keyword corresponding to the action in the keyword library. When the keyword library is searched based on voice keywords, the searching is performed in a descending order of keyword frequencies. Since the user often performs the operation, the frequency of the operation is certainly high, and the operation is top ranking in the keyword library. A search result is obtained quickly by the descending order of keyword frequencies. In addition, after the mobile terminal is operated, the voice keyword library under the operation category may be updated based on the search result in a case that a preset condition is met. For example, a contact is added to the contact list, and then the voice keyword library is updated and the added contact is put into the keyword library as a keyword. The update may be performed at the moment when the contact is added, or may be performed each time the mobile phone is rebooted, which may be set based on practice. When the preset condition is satisfied, the update operation is triggered.

Figure 2:
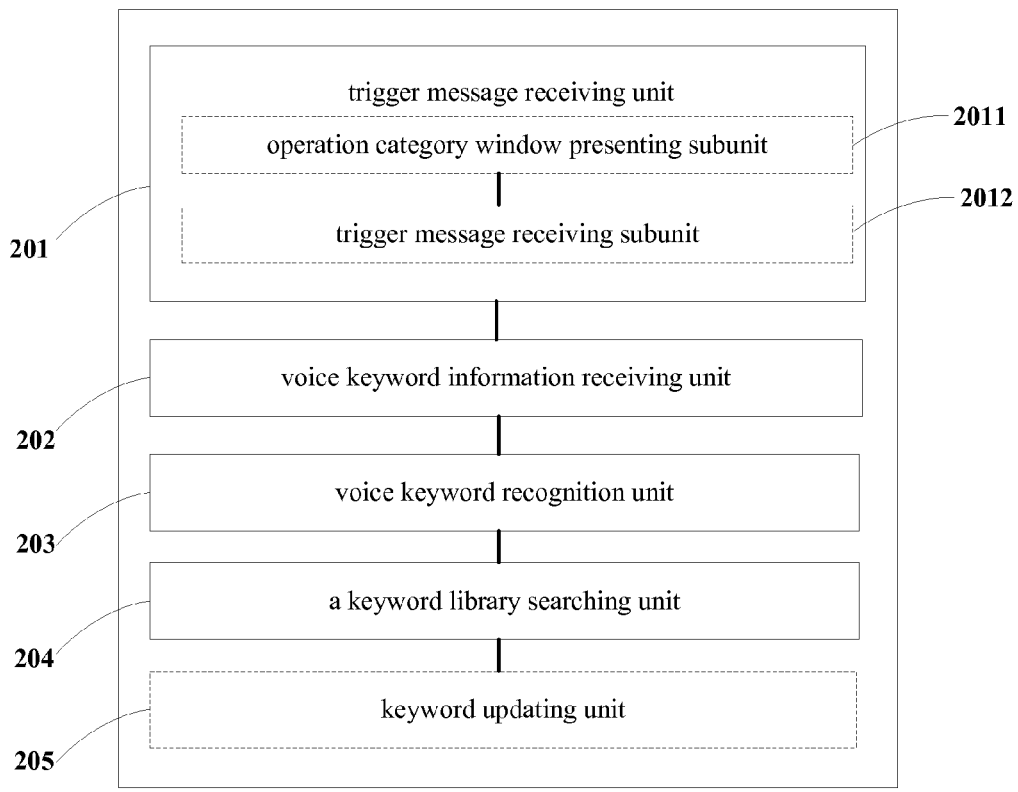
FIG. 2 is a structural diagram of a voice recognition device for a mobile terminal according to an embodiment of the disclosure.

Embodiments of a voice recognition method for a mobile terminal is described in details above, and correspondingly, embodiments of a voice recognition device for a mobile terminal is further provided in the disclosure. Referring to FIG. 2, a structural diagram of a voice recognition device for a mobile terminal according to an embodiment of the disclosure is shown. The device includes a trigger message receiving unit 201, a voice keyword information receiving unit 202, a voice keyword recognition unit 203 and a keyword library searching unit 204.

The trigger message receiving unit 201 is configured to receive a trigger message of an operation category of an operation to be performed on the mobile terminal, where the operation category is one of categories classified by service functions of the mobile terminal.

The voice keyword information receiving unit 202 is configured to receive voice keyword information.

The voice keyword recognition unit 203 is configured to determine a voice keyword from the voice keyword information.

The keyword library searching unit 204 is configured to search, based on the voice keyword, a keyword library under the operation category of the operation to be performed, and return a search result.

The working process of the device embodiment is as follows: the trigger message receiving unit 201 receives the trigger message of an operation category of an operation to be performed on the mobile terminal; the voice keyword information receiving unit 202 receives the voice keyword information, and the voice keyword recognition unit 203 determines the voice keyword from the voice keyword information; and then, based on the voice keyword, the keyword library searching unit 204 searches a keyword library under the operation category of the operation to be performed, and returns a search result.

In the device embodiment, after a trigger message of one of operation categories classified based on service functions of the mobile terminal is received, the voice keyword information is received, the voice keyword is determined from the voice keyword information, then, a corresponding keyword library is searched based on the voice keyword, and a search result is returned. Compared with conventional voice recognition technology, in the device embodiment, the operation categories are classified based on service functions in the embodiments of the disclosure, and the keyword library just corresponds to an operation category, Thus, in one aspect, a retrieved object is limited within the keyword library corresponding to the operation to be performed on the mobile terminal during the search based on the voice keyword, and the number of processed objects is reduced, which adapts to the relatively weak processing ability of the mobile terminal; in another aspect, the reduce of the number of processed objects during the search shortens time for the search, thus an efficiency of voice recognition is improved; and in still another aspect, the reduce of the number of processed objects during the search also decreases probabilities of repetition and ambiguity of the keyword, thereby improving accuracy of voice recognition. Further, in the device embodiment, the voice information is received in the form of voice keyword information rather than an ordinary natural language, therefore, multiple words, long sentences and multiple sentences are avoided. Hence, in one aspect, it is easier to extract the keyword from the voice information, thereby improving the efficiency of voice recognition; and in another aspect, a returned result is obtained through matching the keyword extracted from the voice keyword information with the keyword library, which benefits for the accuracy of voice recognition.

In practice, there are a variety of ways to trigger the operation category, and structures of the trigger message receiving units corresponding to different ways may differ. Two ways are provided hereinafter, and those skilled in the art may deduce other implementations based on these two ways.

In a first way, reception of the trigger message of operation category is determined through a pop-up window and received click or focus movement performed by a user. In this case, the trigger message receiving unit 201 may include an operation category window presenting subunit 2011 and a trigger message receiving subunit 2012.

The operation category window presenting subunit 2011 is configured to present an operation category window on a screen of the mobile terminal.

The trigger message receiving subunit 2012 is configured to receive a trigger message of an operation category of an operation to be performed on the mobile terminal in a case that a label corresponding to an operation category in the operation category window is clicked or is determined as a focus.

In a second way, reception of the trigger message of operation category is determined based on a user's operation recognized by a sensor. In this case, the trigger message receiving unit includes a monitoring-result determining subunit and a trigger message receiving subunit.

The monitoring-result determining subunit is configured to determine whether a component of a gravitational acceleration monitored by a first monitor along z axis is 2 and components of the gravitational acceleration along x and y axes are 7; and whether a distance monitored by a second monitor is zero, where the x and y axes are in a plane of a panel of the mobile terminal, the z axis is perpendicular to the plane formed by the x and y axes, the first monitor is a monitor for a gravity sensor and the monitor is registered after a sensor service is received, and the second monitor is a monitor for a distance sensor and the monitor is registered after the sensor service is received.

The trigger message receiving subunit is configured to determine that a trigger message of an operation category of an operation to be performed on the mobile terminal is received if all the above determinations are positive, where the operation category is contact.

In the second way, other functional units change accordingly. That is, the voice keyword information receiving unit is configured to receive the voice keyword information including a contact, the voice keyword recognition unit is configured to determine a contact keyword from the voice keyword information, and the keyword library searching unit is configured to search a contact library according to the contact keyword, and returns a retrieved contact. The device embodiment further includes a calling unit configured to call the retrieved contact. Further, the device embodiment includes a contact numbering unit and a numbered voice information receiving unit. The contact numbering unit is configured to number each contact in a case that there are multiple contacts retrieved based on the contact keyword, the numbered voice information receiving unit is configured to receive numbered voice information, and the calling unit is configured to call a contact corresponding to the numbered voice information.

In addition, modification and equivalent substitution may be performed to obtain better technical effects. For example, the embodiment further includes a keyword frequency increasing unit. The keyword frequency increasing unit is configured to configured to increase a frequency of the keyword corresponding to the operation and in the keyword library under the operation category after the operation is performed on the mobile terminal, and the keyword library searching unit is configured to search the keyword library according to a descending order of keyword frequencies when searching, based on the voice keyword, the keyword library under the operation category of the operation to be performed. Speed of retrieval may be improved by introducing this unit. Another example, the embodiment may further include a keyword updating unit 205. The keyword updating unit 205 is configured to update, after the operation is performed on the mobile terminal, the keyword library under the operation category based on an operation result in a case that a preset condition is met.

It should be noted that, for convenience of description, the embodiments of the disclosure and various modifications to the embodiments focus on the differences from other embodiments or modifications, and for the same or similar parts, the embodiments or modifications may refer to each other. The modifications to the device embodiments are basically similar to the method embodiments, so description thereof is brief, and the method embodiments may be referred to for relevant information. The individual units described in the device embodiments may be or not be physically separate, and may be located at one place, or be distributed on various network environments. In practice, all of or a few of the units may be chosen as desired to achieve the purposes of the embodiments, and those skilled in the art may understand and implement the embodiments without creative work.

The forgoing description is merely particular implementation of the disclosure. It should be noted that, some modifications and polish may be further made by those skilled in the art without departing from the principle of the invention, and the modifications and polish also fall within the protection scope of the disclosure.

What is claimed is:

1. A voice recognition method for a mobile terminal, comprising:
   receiving a trigger message of an operation category of an operation to be performed on the mobile terminal, wherein the operation category is one of categories classified by service functions of the mobile terminal;
   receiving voice keyword information, and determining a voice keyword from the voice keyword information; and
   searching, based on the voice keyword, a keyword library under the operation category of the operation to be performed, and returning a search result,
   wherein after the operation is performed on the mobile terminal, a frequency of the keyword corresponding to the operation and in the keyword library under the operation category is increased, and keywords in the keyword library are searched according to a descending order of keyword frequencies when the keyword library under the operation category of the operation to be performed is searched based on the voice keyword.

2. The method according to claim 1, wherein the receiving a trigger message of an operation category of an operation to be performed on the mobile terminal comprises:
   presenting an operation category window on a screen of the mobile terminal, and determining that a trigger message of an operation category of an operation to be performed on the mobile terminal is received in a case that a label corresponding to an operation category in the operation category window is clicked or is determined as a focus.

3. The method according to claim 2, wherein the label corresponding to an operation category in the operation category window comprises a contact label for communication service, an application label for application service, a music label for music playing service, and/or a web search label for online search service.

4. The method according to claim 1, wherein the receiving a trigger message of an operation category of an operation to be performed on the mobile terminal comprises:
   determining whether a component of a gravitational acceleration monitored by a first monitor along z axis is in a range of zero to four gravitational acceleration units, whether components of the gravitational acceleration along x and y axes respectively are in a range of four to ten gravitational acceleration units, and whether a distance monitored by a second monitor is zero, wherein the x and y axes are in a plane of a panel of the mobile terminal, the z axis is perpendicular to the plane formed by the x and y axes, the first monitor is a monitor for a gravity sensor and the monitor is registered after a sensor service is received, and the second monitor is a monitor for a distance sensor and the monitor is registered after the sensor service is received; if yes for all the determinations, then determining that a trigger message of an operation category of an operation to be performed on the mobile terminal is received, wherein the operation category is contact;

and then the receiving voice keyword information, determining a voice keyword from the voice keyword information, searching, based on the voice keyword, a keyword library under the operation category of the operation to be performed, and returning a search result comprising:

receiving voice keyword information including a contact, determining a contact keyword from the voice keyword information, searching a contact library according to the contact keyword, returning a retrieved contact and calling the contact.

5. The method according to claim 4, wherein in a case that a plurality of contacts are retrieved according to the contact keyword, each of the plurality of contacts is numbered, numbered voice information is received, and a contact corresponding to the numbered voice information is called.

6. The method according to claim 1, wherein after the operation is performed on the mobile terminal, the voice keyword library under the operation category is updated based on the search result in a case that a preset condition is met.

7. A voice recognition device for a mobile terminal, comprising a trigger message receiving unit, a voice keyword information receiving unit, a voice keyword recognition unit and a keyword library searching unit, wherein:

the trigger message receiving unit is configured to receive a trigger message of an operation category of an operation to be performed on the mobile terminal, wherein the operation category is one of categories classified by service functions of the mobile terminal;

the voice keyword information receiving unit is configured to receive voice keyword information;

the voice keyword recognition unit is configured to determine a voice keyword from the voice keyword information; and the keyword library searching unit is configured to search, based on the voice keyword, a keyword library under the operation category of the operation to be performed, and return a search result, wherein the device further comprises a keyword frequency increasing unit configured to increase a frequency of the keyword corresponding to the operation and in the keyword library under the operation category after the operation is performed on the mobile terminal, and the keyword library searching unit is configured to search the keyword library according to a descending order of keyword frequencies when searching, based on the voice keyword, the keyword library under the operation category of the operation to be performed.

8. The device according to claim 7, wherein the trigger message receiving unit comprises an operation category window presenting subunit and a trigger message receiving subunit;

the operation category window presenting subunit is configured to present an operation category window on a screen of the mobile terminal, and the trigger message receiving subunit is configured to receive a trigger message of an operation category of an operation to be performed on the mobile terminal in a case that a label corresponding to an operation category in the operation category window is clicked or is determined as a focus.

9. The device according to claim 7, wherein the trigger message receiving unit comprises a monitoring-result determining subunit and a trigger message receiving subunit;

the monitoring-result determining subunit is configured to determine whether a component of a gravitational acceleration monitored by a first monitor along z axis is in a range of zero to four gravitational acceleration units, whether components of the gravitational acceleration along x and y axes respectively are in a range of four to ten gravitational acceleration units, and whether a distance monitored by a second monitor is zero, wherein the x and y axes are in a plane of a panel of the mobile terminal, the z axis is perpendicular to the plane formed by the x and y axes, the first monitor is a monitor for a gravity sensor and the monitor is registered after a sensor service is received, and the second monitor is a monitor for a distance sensor and the monitor is registered after the sensor service is received;

the trigger message receiving subunit is configured to determine that a trigger message of an operation category of an operation to be performed on the mobile terminal is received if yes for all the determinations, wherein the operation category is contact;

the voice keyword information receiving unit is configured to receive voice keyword information comprising a contact, the voice keyword recognition unit is configured to determine a contact keyword from the voice keyword information, the keyword library searching unit is configured to search a contact library according to the contact keyword, and return a retrieved contact; and the device further comprises a calling unit configured to call the retrieved contact.

10. The device according to claim 9, wherein the device comprises a contact numbering unit and a numbered voice information receiving unit, the contact numbering unit is configured to number each contact in a case that a plurality of contacts are searched based on the contact keyword, the numbered voice information receiving unit is configured to receive numbered voice information, and the calling unit is configured to call a contact corresponding to the numbered voice information.

11. The device according to claim 7, wherein the device further comprises a keyword updating unit configured to, after the mobile terminal is operated, update the keyword library under the operation category according to an operation result in a case that a preset condition is met.

* * * * *